April 14, 1936.　　　W. B. ANDERSON　　　2,037,299
CULTIVATOR
Filed May 22, 1935　　　2 Sheets-Sheet 1
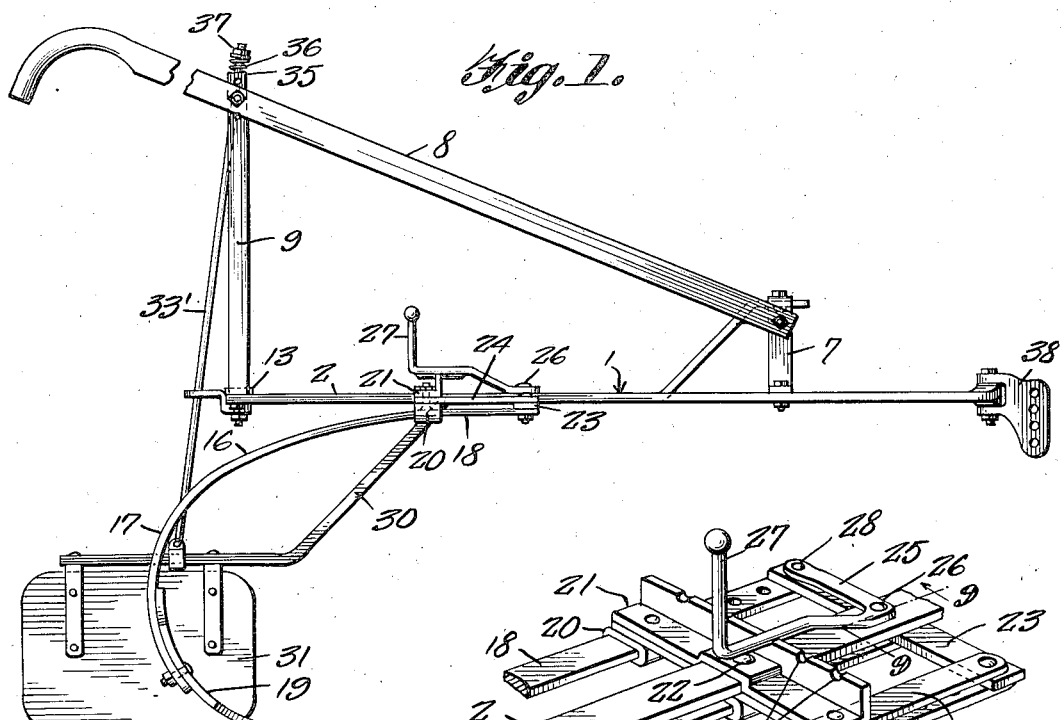
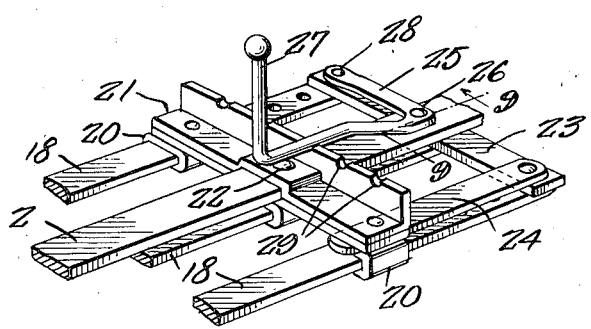
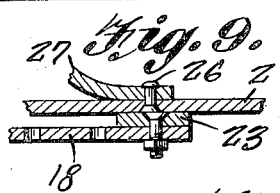
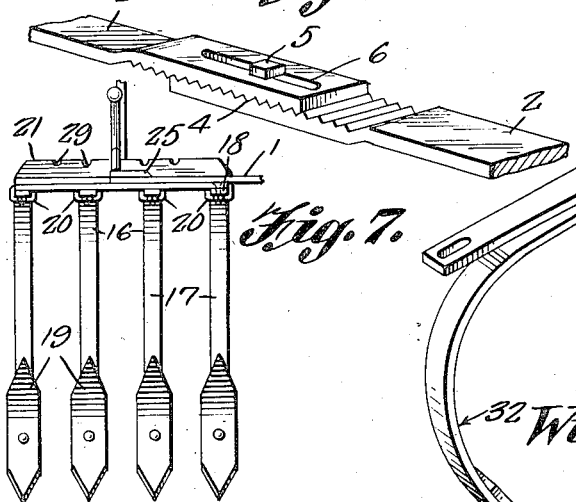
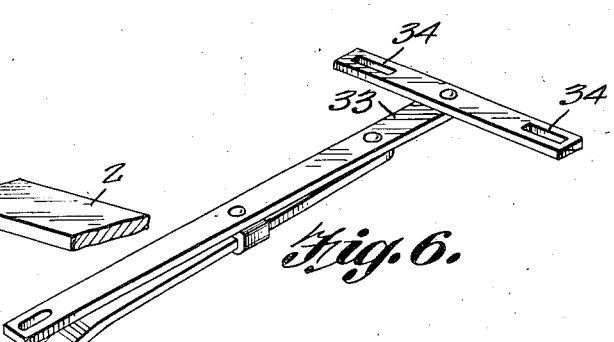
William B. Anderson, INVENTOR
BY Victor J. Evans & Co.
ATTORNEY April 14, 1936. W. B. ANDERSON 2,037,299
CULTIVATOR
Filed May 22, 1935 2 Sheets-Sheet 2
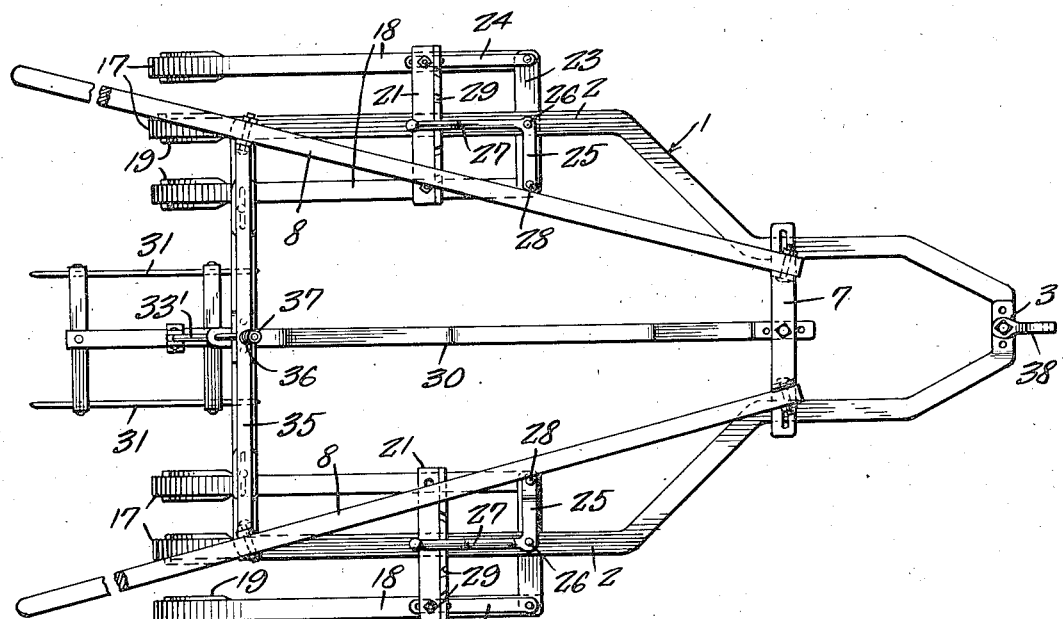
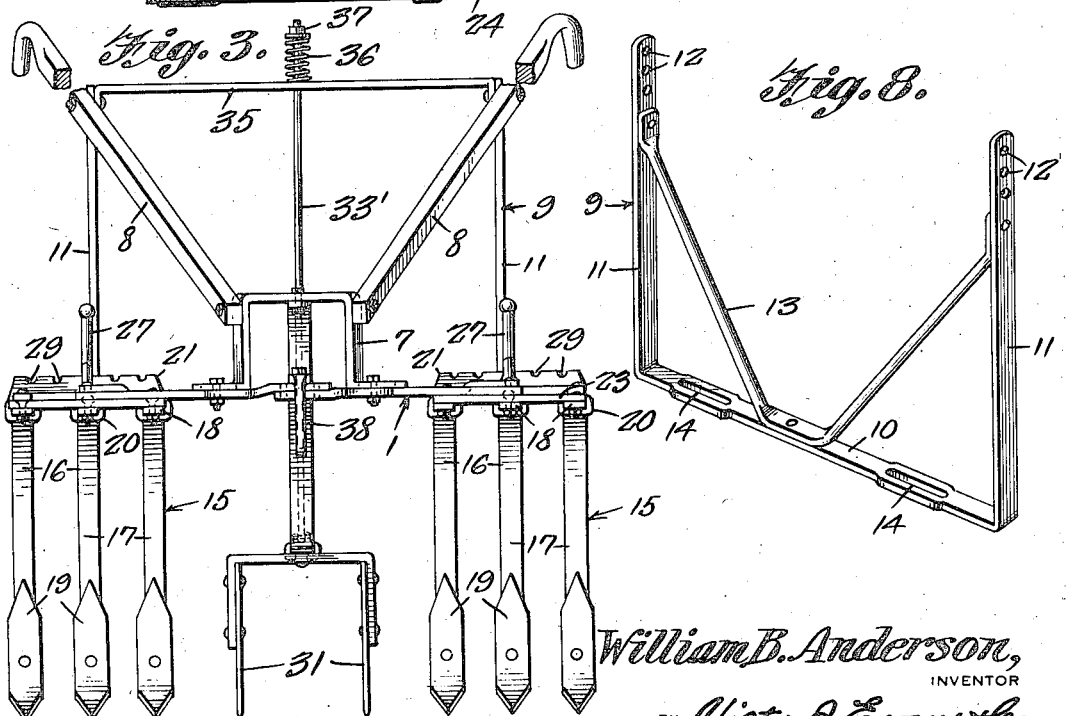

Patented Apr. 14, 1936

2,037,299

UNITED STATES PATENT OFFICE 2,037,299

CULTIVATOR

William B. Anderson, Collinsville, Ala.

Application May 22, 1935, Serial No. 22,868

1 Claim. (Cl. 97—172)

This invention relates to cultivators of the type operable between rows of growing vegetation to cultivate or work soil and to destroy foreign growth between the rows of vegetation and adjacent the roots thereof and has for the primary object the provision of a device of this character wherein gangs of spring teeth are carried by an adjustable main frame to permit the gangs to be adjusted towards and from each other to adapt the device for use between rows of vegetation which vary in distances from one another.

Another object of this invention is the provision of means for adjusting teeth of each gang so that said teeth may be aligned or be arranged in staggered relation to each other.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a cultivator constructed in accordance with my invention.

Figure 2 is a top plan view illustrating the same.

Figure 3 is a front elevation illustrating the same.

Figure 4 is a fragmentary perspective view showing means for adjusting the teeth of a gang of teeth.

Figure 5 is a fragmentary perspective view illustrating one of the adjustable connections for the main frame of the device.

Figure 6 is a perspective view illustrating a spring tooth and mounting therefor to the main frame to be employed in lieu of a fender on the cultivator.

Figure 7 is a fragmentary front elevation illustrating a modification of one of the gangs of my invention.

Figure 8 is a perspective view illustrating a brace on the main frame for the handles of the cultivator.

Figure 9 is a detail sectional view taken on the line 9—9 of Figure 4.

Referring in detail to the drawings, the numeral 1 indicates an adjustable main frame consisting of side members 2 having their forward portions curved inwardly and forwardly and inwardly and adjustably connected, as shown at 3, for the purpose of forming the forward portion of the main frame of a width less than the width of the rear portion of the main frame. The side members 2 adjacent their rear ends are bent angularly into overlapped relation and serrated, as shown at 4. The serrations of the overlap of the rear end portions of the main frame interfit and the overlapped portions are detachably connected by a bolt 5 extending through slots 6. Thus it will be seen that the side members are detachably and adjustably connected at the front and rear ends of the main frame.

A handle attaching bracket 7 is adjustably secured to the forward portion of the main frame 1 and has the forward ends of handles 8 detachably secured thereto. The handles extend upwardly and rearwardly with respect to the main frame and are adjustably supported adjacent their rear ends by a handle bracket 9. The latter is of substantially U-shape including a bight portion 10 and parallel arms 11. The bight portion is adjustably secured to the rear end of the frame and extends transversely of the latter with the parallel arms 11 disposed vertically and provided with a series of openings 12 to receive bolts for adjustably connecting the handles 8 thereto. A brace 13 is provided between the arms 11 and bight portion 10 of the bracket 9. The bracket 9 is adjustably secured to the rear end of the frame 1 by bolts extending through slots 14 in the bight portion 10. The brackets 7 and 9 being adjustably secured to the main frame permit the side members 2 of said main frame to be adjusted towards and from each other.

Gangs of spring teeth 15 are connected to the side members 2 of the main frame and are preferably of three in number to each gang, as shown in Figures 2 and 3. However, four teeth may be employed to a gang as disclosed by Figure 7. Each tooth consists of a resilient shank 16 having a curved portion 17 and a straight portion 18. The free end of the curved portion 17 has detachably secured thereto a blade or shoe 19 for acting on the soil. The straight portions 18 of the teeth of each gang are slidably mounted in cuffs 20 carried by a bracket 21. The brackets 21 of the gangs are secured to the side members 2, as shown at 22, and are arranged transversely thereof. The straight portions 18 of the teeth of each gang at their forward ends have pivoted thereto a connecting plate 23. A die plate 24 is arranged between the bracket 21 and one end of the connecting plate 23 and parallels the straight portion 18 of one of the teeth of the gang.

Bell crank levers 25 are pivoted to the side members 2 of the main frame, as shown at 26, and are provided with handles 27. The bell crank levers are pivoted to one end of the connecting plates 23, as shown at 28. The handles 27 are movable relative to the brackets 21 to position the bell crank levers into and out of notches 29 of said brackets for adjustably securing the bell crank levers in different positions. The bell crank levers are capable of imparting endwise movement to certain of the spring teeth of each gang for the purpose of aligning the shoes or blades thereof or for arranging the shoes in staggered relation relative to one another.

A fender arm 30 is detachably secured to the main frame and extends downwardly and rearwardly thereof and carries spaced fenders 31 which operate between the gangs of teeth. If desired, the fenders 31 may be dispensed with by removing the arm 30 from the main frame and employing in lieu thereof a spring tooth 32 similar in construction to the spring teeth 15. The spring tooth 32 is secured to an attaching plate 33 which may be adjustably and detachably secured to the main frame by bolts extending through slots 34 thereof. The fenders 31 may be yieldably supported in engagement with the ground when used on a cultivator by a rod 33' pivoted thereto and slidable through a brace 35 connected to the upper ends of the arms 11 of the bracket 9. Surrounding the rod 33' is a coil spring 36 bearing against a nut or head 37 on the rod and the brace 35 and the acts to urge the rod 35 downwardly to place pressure on the fender 31 against the ground.

It is to be understood that when the fender 31 is removed from the cultivator, the rod 33' is also removed.

The forward end of the main frame has detachably connected thereto a clevis 38 of the character which will permit a drafting medium to be adjustably connected to the cultivator in such a way that the forward end of the cultivator may be raised or lowered with respect to the draft medium.

Having described the invention, I claim:

A cultivator comprising a main frame including side members, handles connected to the frame, brackets secured to the side members of the frame, cuffs carried by said brackets, spring teeth slidably received by the cuffs and arranged thereby into gangs, connecting plates pivoted to the forward ends of the teeth of said gangs, bell crank levers pivoted to the main frame and to the connecting plates, and handles formed on said bell crank levers, said brackets having notches to receive the bell crank levers for holding the bell crank levers in adjusted positions whereby the positions of the teeth of the gangs may be varied relative to each other.

WILLIAM B. ANDERSON.